E. T. REUTER AND W. A. SKINNER.
CRIMPING MACHINE.
APPLICATION FILED DEC. 10, 1919.
1,345,240.
Patented June 29, 1920.
2 SHEETS—SHEET 1.
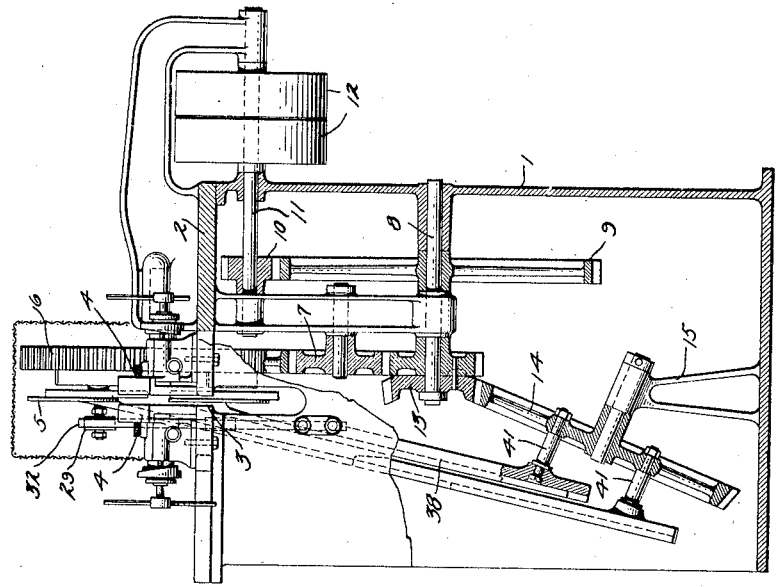
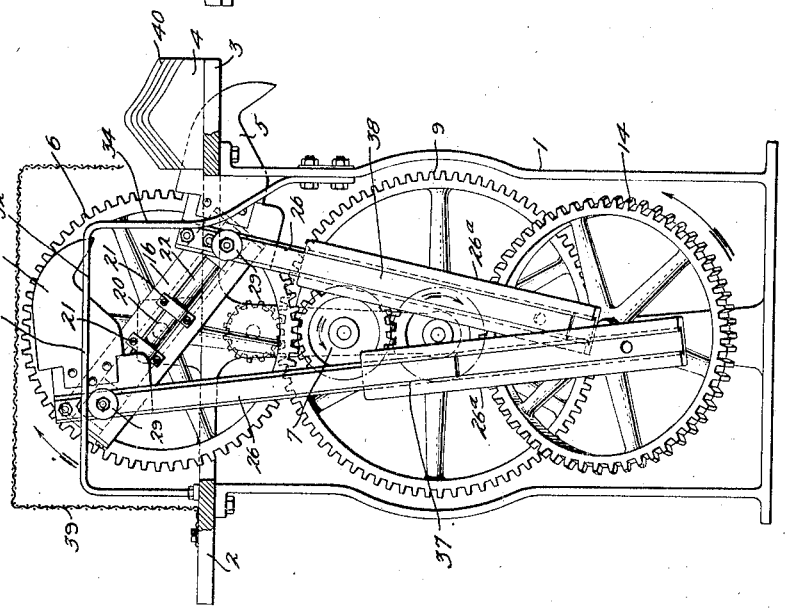
WITNESSES
INVENTORS
Earl T. Reuter and
Willard A. Skinner
BY
ATTORNEYS

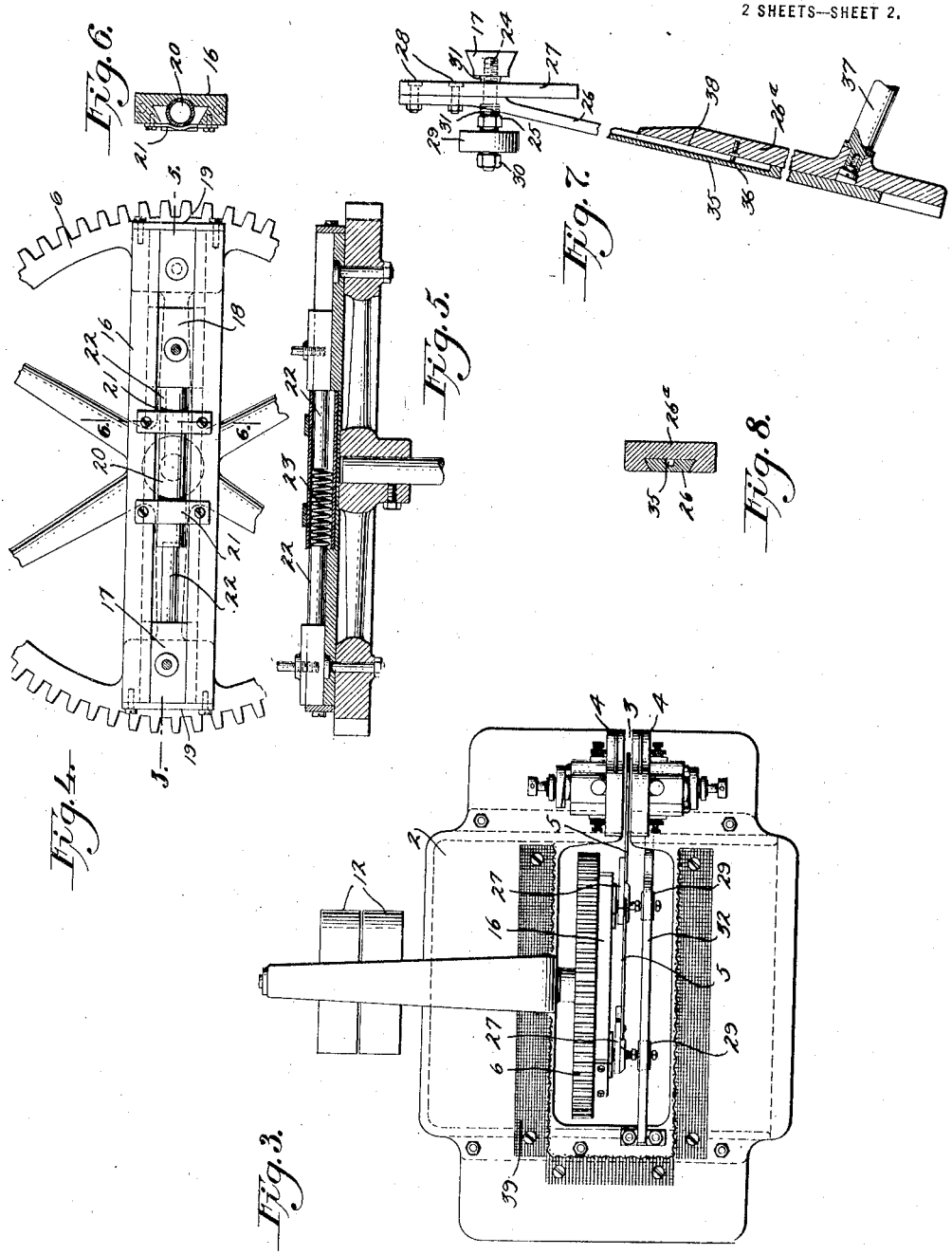

UNITED STATES PATENT OFFICE.

EARL T. REUTER AND WILLARD A. SKINNER, OF MANCHESTER, NEW HAMPSHIRE.

CRIMPING-MACHINE.

1,345,240.   Specification of Letters Patent.   Patented June 29, 1920.

Application filed December 10, 1919. Serial No. 343,812.

*To all whom it may concern:*

Be it known that we, EARL T. REUTER and WILLARD A. SKINNER, both citizens of the United States, and residents of Manchester, in the county of Hillsborough and State of New Hampshire, have invented a new and Improved Crimping-Machine, of which the following is a full, clear, and exact description.

This invention relates to improvements in crimping machines, an object of the invention being to improve upon the construction illustrated in Patent Number 804,482, granted November 14, 1905, to A. G. Legge.

A further object is to provide improved mounting and operating mechanism for a pair of form plates which double the capacity of the machine over the Legge machine and which facilitate the employment of guards to protect the operator.

With these and other objects in view the invention consists in certain novel features of construction, and combinations and arrangements of parts, as will be more fully hereinafter described and pointed out in the claims.

In the accompanying drawings—

Figure 1 is a view in vertical longitudinal section illustrating our improvements;

Fig. 2 is a view partly in end elevation and partly in transverse section;

Fig. 3 is a top plan view with the guard broken away;

Fig. 4 is a fragmentary view in elevation illustrating the mounting for the form plates;

Fig. 5 is a view in section on the line 5—5 of Fig. 4, the parts being shown in elevation;

Fig. 6 is a view in transverse section on the line 6—6 of Fig. 4;

Fig. 7 is a view partly in elevation and partly in section illustrating the manner of connecting one of the form plate supporting blocks to the pitman operating the same; and Fig. 8 is a view in section on the line 8—8 of Fig. 7.

1 represents a supporting frame having a table 2 thereon. This table 2 has a slot 3 at one end and on the table at opposite sides of the slot, heads 4 are mounted. These heads 4 may be constructed precisely like the heads of the Legge patent above referred to, or may be otherwise constructed, and as they form no part of the present invention, they need not be described in detail. The heads are heated in any approved manner and are to perform the same function as the heads of the patent above referred to.

Our invention resides in the mounting and operating mechanism for the form plates 5, and it will be noted particularly by reference to Fig. 1, that we employ two of these form plates, whereas the patent to Legge employs but one form plate which is caused to reciprocate vertically and there is a loss of time and production during the upward movement of the Legge plate, whereas with our device one plate 5 is always descending so that a double production is possible with our machine.

6 represents a relatively large gear wheel which projects through the table 2 and is driven by a gear train 7, the lowermost gear of the train 7 being secured upon a shaft 8 which is connected by intermeshing gears 9 and 10 with the drive shaft 11 having operating pulleys 12 thereon. Another gear wheel 13 is fixed to the shaft 8 and drives a relatively large gear wheel 14 disposed at an angle and supported by any suitable bracket 15 or other mounting. The gears 6 and 14 support our improved operating support and constitute portions of our improved form plate operating mechanism which will now be described in detail.

On the gear wheel 6 and extending across the center thereof, a dove-tailed runway 16 is secured and in this runway 16 dove-tailed blocks 17 are mounted to slide and are limited in their movements by plates 19 secured on the ends of the runway. A cylinder 20 is secured centrally in the runway by means of transverse cleats 21 and in this cylinder plungers 22 are mounted, and a coiled spring 23 is located in the cylinder between the plungers tending to force them apart and hence, to force the blocks to the outer ends of the runway. Studs 24 are screwed into the blocks 17 and are provided with angular heads 25 intermediate their ends to facilitate this operation. The studs 25 are projected through the upper ends of pitmen members 26 and through supporting blocks 27, and these parts 26 and 27 are secured bolted together, as shown at 28.

On the outer ends of the studs 24 rollers 29 are mounted and nuts 30 are screwed onto the outer ends of the studs to hold the rollers in place. Washers 31 are provided on the studs 24 and interposed between the several parts above referred to, to hold them in proper relation to each other, as will be understood.

The supporting blocks 27 carry the form plates 5 above referred to, and the rollers 29 are adapted to run against the under face of a track 32 secured to the support 1. This track 32 has a horizontal portion 33 which compels the form plates to move in a horizontal line and forwardly, and a vertical portion 34 of the track compels the form plates to move downwardly in a vertical path during the rotation of the gear wheel 6 as will more fully hereinafter appear.

It will be noted particularly by reference to Fig. 7, that the pitman member 26 is secured at an angle to the supporting block 27. This pitman member 26 has dove-tailed telescoping engagement with a pitman member 26$^a$ and in its under face is formed with a longitudinal groove 35 receiving a stud 36 on member 26$^a$, so that when the stud reaches the end of the groove 35, the telescoping action will be limited. For clearness of description, the reference numerals 37 and 38 are applied to the two pitmen and, as above explained, each pitman consists of the two telescoping members 26 and 26$^a$. The pitmen members 26$^a$ have pivotal connection with crank pins 41 carried by the gear wheel 14 and located at opposite sides of the center of said gear wheel. It will be noted that the gear wheels 6 and 14 turn in opposite directions so that it is necessary for the gear wheel 14 to be positioned at an angle to allow the pivotal connections of the pitmen and the gear wheel to pass each other in the rotary movement of the gear wheel. By reason of the construction above described, it is possible to conveniently locate a guard 39 over the form plates and heads and this guard may be of any suitable material and secured in any approved manner to protect the hands of the operator.

The operation of the machine is as follows: As in the Legge patent, the stock indicated at 40 is placed over the heads 4 and the form plates are brought downwardly in contact therewith, while the heads are heated so that the plates carry the stock between the heads and drop the crimped stock through the slot 3. As the gear wheel 6 revolves in the direction of the arrow indicated in Fig. 1, the roller 29 will engage the under face of the track 32 and cause the form plate 5 to move forwardly in a horizontal path, this movement being compensated for by the movement of the block 17 in the runway 16 causing the compression of the spring 23. As the roller 29 reaches the end of the horizontal portion 33 of the track, it will ride down the vertical portion 34 of the track and cause the form plate to descend in a vertical path between the heads. It will therefore be noted that as one of the form plates 5 finishes its operation, as shown in Fig. 1, the other form plate is moved into position to begin its operation. Hence, at each complete turn of the gear wheel 6 both form plates are moved between the heads. By reason of this construction, we double the production of the Legge patent above referred to, without increasing the speed of the machine.

Various slight changes may be made in the general form and arrangement of parts described without departing from the invention, and hence we do not limit ourselves to the precise details set forth, but consider ourselves at liberty to make such changes and alterations as fairly fall within the spirit and scope of the appended claims.

We claim:

1. In a crimping machine, the combination with a support, and a pair of heads on the support, of a rotary support, a guide on the rotary support, and a pair of form plates supported by the guide, movable longitudinally of the guide and moved in turn by the rotary support between the heads.

2. In a crimping machine, the combination with a support, and a pair of heads on the support, of a gear wheel, a runway secured to the gear wheel and extending across the center thereof, spring-pressed blocks in the runway, and form plates carried by the blocks and movable between the heads.

3. In a crimping machine, the combination with a pair of heads, of a rotary support, a pair of form plates on the rotary support movable between the heads, a track on the support, and rollers operatively connected with the form plates and movable against the track, whereby the form plates are compelled to move in a vertical path between the heads.

4. In a crimping machine, the combination with a support, and a pair of heads on the support, of a rotary support, a guide on the rotary support, a pair of form plates supported by the guide, movable longitudinally of the guide and moved in turn by the rotary support between the heads, a track on the support, and rollers operatively connected with the form plates and movable against the track, whereby the form plates are compelled to move in a vertical path between the heads.

5. In a crimping machine, the combination with a support, and a pair of heads on the support, of a gear wheel, a runway secured to the gear wheel and extending across the center thereof, spring-pressed blocks in the runway, form plates carried by the blocks and movable between the heads, a track on the support, and rollers operatively connected with the form plates and movable against the track, whereby the form plates are compelled to move in a vertical path between the heads.

6. In a crimping machine, the combination with a support, and a pair of heads on the support, of a gear wheel, a runway secured to the gear wheel and extending across the center thereof, sliding blocks in the runway, a cylinder secured centrally in the runway, pistons connected to the blocks and located in the cylinder, a spring in the cylinder exerting pressure on the pistons, and form plates connected to the blocks and moved in between the heads.

7. In a crimping machine, the combination with a support, and a pair of heads on the support, of a gear wheel, a runway secured to the gear wheel and extending across the center thereof, sliding blocks in the runway, a cylinder secured centrally in the runway, pistons connected to the blocks and located in the cylinder, a spring in the cylinder exerting pressure on the pistons, a second gear wheel located below the first-mentioned gear wheel and disposed at an angle, crank pins on the last-mentioned gear wheel, pitmen connecting the blocks and the crank pins, said pitmen comprising telescoping sections, and form plates secured to the blocks and movable between the heads.

8. In a crimping machine, the combination with a support, and a pair of heads on the support, of a gear wheel, a runway secured to the gear wheel and extending across the center thereof, sliding blocks in the runway, a cylinder secured centrally in the runway, pistons connected to the blocks and located in the cylinder, a spring in the cylinder exerting pressure on the pistons, form plates connected to the blocks and moved in between the heads, rollers operatively connected to the blocks, and a track on the support engaged by the rollers, said track having a horizontal portion compelling the form plates to move horizontally as they are projected forwardly, and said track having a vertical portion engaged by the rollers compelling the form plates to move vertically as they pass between the heads.

9. In a crimping machine, the combination with a support, and a pair of heads on the support, of a gear wheel, a runway secured to the gear wheel and extending across the center thereof, sliding blocks in the runway, a cylinder secured centrally in the runway, pistons connected to the blocks and located in the cylinder, a spring in the cylinder exerting pressure on the pistons, a second gear wheel located below the first-mentioned gear wheel and disposed at an angle, crank pins on the last-mentioned gear wheel, pitmen connecting the blocks and the crank pins, said pitmen comprising telescoping sections, form plates secured to the blocks and movable between the heads, rollers operatively connected to the blocks, and a track on the support engaged by the rollers, said track having a horizontal portion compelling the form plates to move horizontally as they are projected forwardly, and said track having a vertical portion engaged by the rollers compelling the form plates to move vertically as they pass between the heads.

EARL T. REUTER.
WILLARD A. SKINNER.